United States Patent [19]

Kaye

[11] Patent Number: 4,494,061
[45] Date of Patent: Jan. 15, 1985

[54] CONTROL APPARATUS

[75] Inventor: Arthur Kaye, Preston, England

[73] Assignee: British Aerospace Public Limited Company, London, England

[21] Appl. No.: 625,187

[22] Filed: Jun. 27, 1984

Related U.S. Application Data

[63] Continuation of Ser. No. 242,564, Mar. 11, 1981, abandoned.

[30] Foreign Application Priority Data

Mar. 15, 1980 [GB] United Kingdom ............... 8008846
Sep. 26, 1980 [GB] United Kingdom ............... 8031102

[51] Int. Cl.³ ............................................. G05B 11/01
[52] U.S. Cl. .................................... 318/628; 318/687; 318/696; 318/135
[58] Field of Search ............... 318/687, 254 A, 135, 318/653, 136, 628, 696

[56] References Cited

U.S. PATENT DOCUMENTS

| | | | |
|---|---|---|---|
| 3,628,145 | 12/1971 | Kihlberg | 318/653 X |
| 3,771,037 | 11/1973 | Bailey, Jr. | 318/628 X |
| 3,832,610 | 8/1974 | Shimizu et al. | 318/687 X |
| 4,012,676 | 3/1977 | Giebler | 318/687 X |
| 4,283,764 | 8/1981 | Crum et al. | 318/628 X |
| 4,320,493 | 3/1982 | Kikuchi et al. | 318/687 X |
| 4,359,677 | 11/1982 | Dennon | 318/687 |
| 4,367,532 | 1/1983 | Crum et al. | 318/628 X |

OTHER PUBLICATIONS

IBM Tech. Bulletin, vol. 14, No. 12, May 1972, p. 3820, Track Seeking Device, F. Kurzweil.

*Primary Examiner*—B. Dobeck
*Attorney, Agent, or Firm*—Cushman, Darby & Cushman

[57] ABSTRACT

Control apparatus, for example a thrust demand unit or "throttle box" for an aircraft, comprises a manually movable control grip coupled to drive motor means comprising twin magnetically interactive components and operable for automatic movement of the control grip, e.g. under autopilot control, while allowing override by the operator e.g. the pilot of an aircraft. The drive motor may be a linear motor, particularly a motor comprising a rod and rider each having pole teeth defining relative positions of minimum magnetic reluctance between the rod and rider, and winding means for moving the rider stepwise between said positions.

13 Claims, 9 Drawing Figures

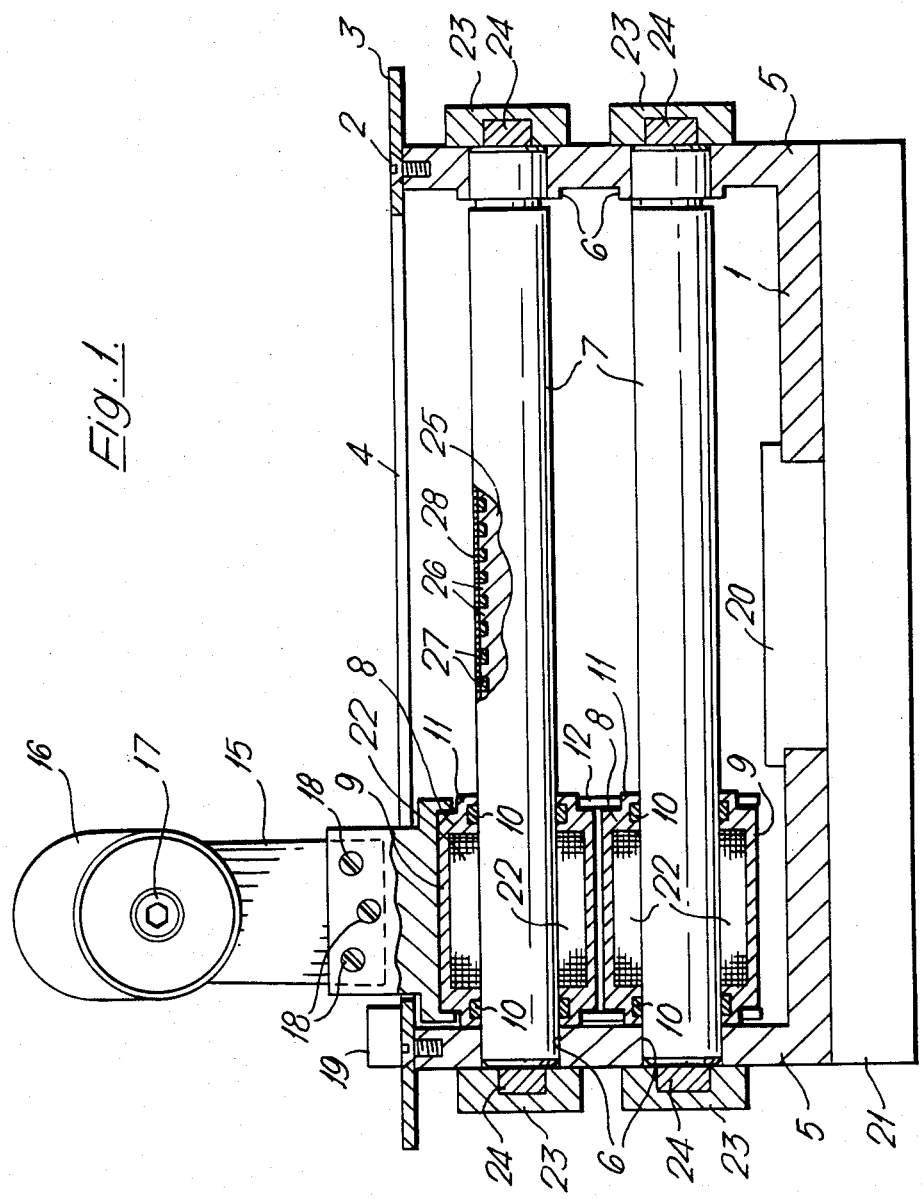

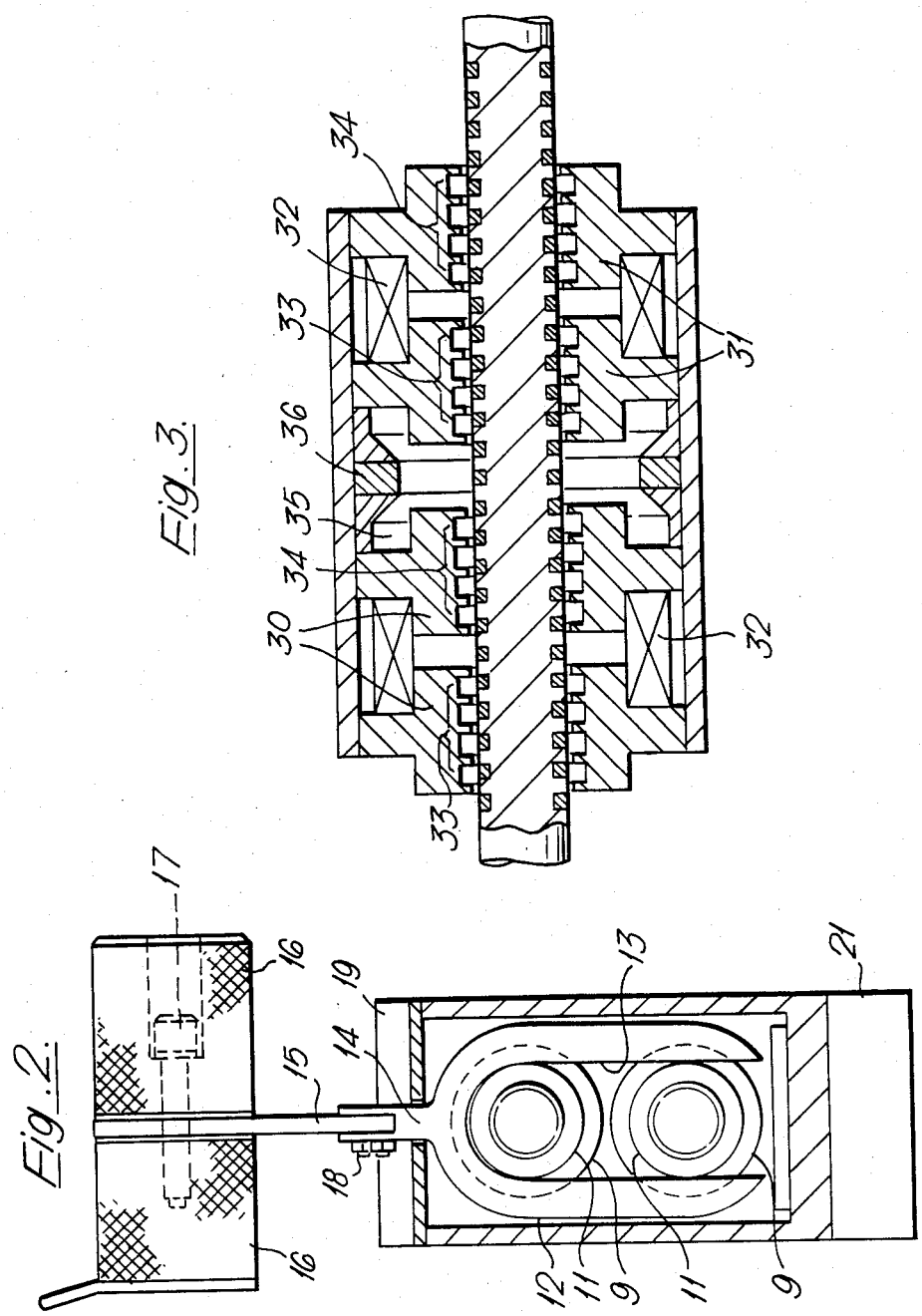

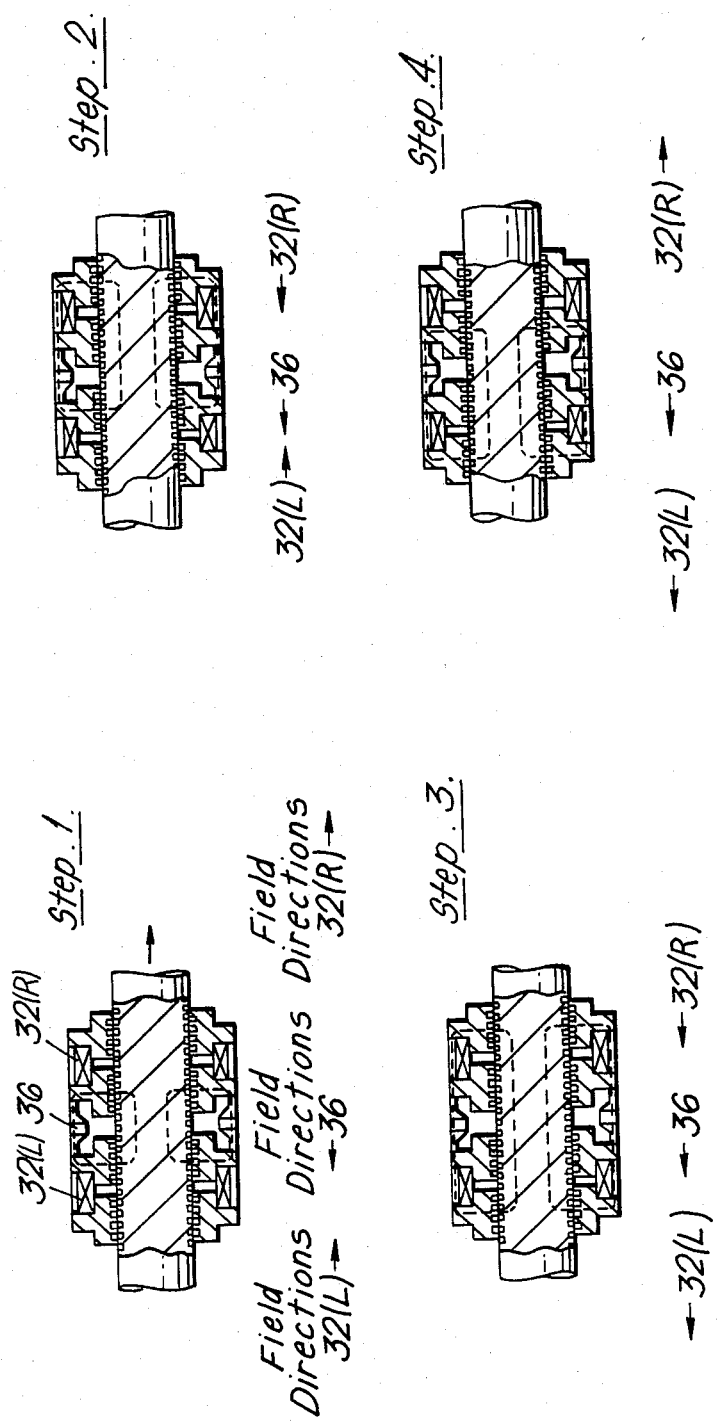

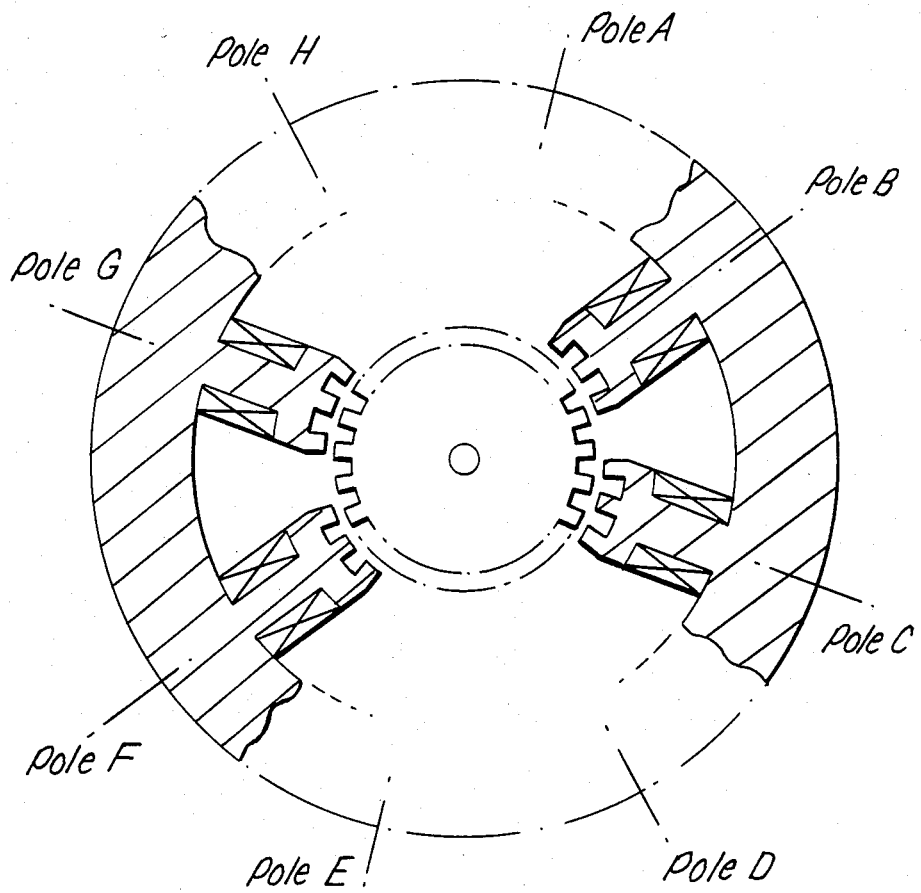
Fig. 9.
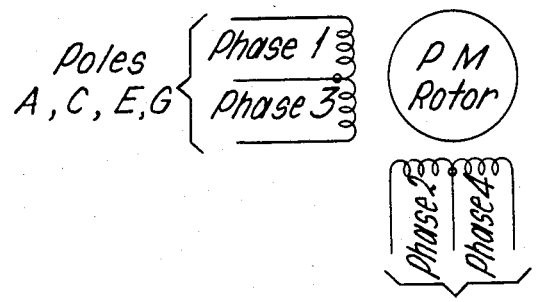

CONTROL APPARATUS

This is a continuation of application Ser. No. 242,564, filed Mar. 11, 1981, now abandoned.

This invention relates to apparatus for effecting control, such apparatus capable of being operated manually and automatically with the automatic operation being overridable by the manual operation. More particularly, but not exclusively it relates to a thrust demand unit, i.e. a "throttle box" for an aircraft.

In an aircraft, the throttle of the or each engine is controlled by a cockpit mounted thrust demand unit comprising a throttle lever assembly, the manual or automatic positioning of the throttle lever effecting thrust changes of propulsion plant.

It is essential that the automatic mode of operation is capable of being readily overridden by the pilot.

The present invention has for an objective the provision of control apparatus having not only a readily available but an instantaneous manual override capability.

For ergonomic reasons and/or aircrew preference, it is desirable that the throttle control lever should move linearly to control the engine throttle and that engine throttle control by the aircraft autopilot should be transmitted via the throttle control lever and be apparent there as movements of the lever (this gives the pilot a measure of "feel" and confidence in the autopilot operation). Thus, the thrust demand unit has to comprise means for transmitting information about the lever position to the engine throttle and to the autopilot (so that, for example, override by the pilot is signalled to the autopilot) and means for moving the throttle lever under autopilot control. Thus, it will be appreciated that a thrust demand unit may be a quite complex item with consequent bulk and weight. Generally, linear movement of the throttle lever is approximated by having the lever moving on a pivot through a shallow arc - this adds to the size of the unit because of course the pivot point must be an appropriately large distance from the grip portion of the lever.

Accordingly it is a further object of the invention to provide a substantially more compact thrust demand unit or "throttle box" which provides the required functions and also provides true linear movement of the throttle control lever.

According to one aspect of the present invention, apparatus for effecting control includes a fixed portion, a movable member carried by and capable of being positioned manually or automatically with reference to the fixed portion, and drive means for effecting such automatic positioning comprising twin magnetically interacting components, one associated with the movable member and one associated with the fixed portion.

By this arrangement, it is found that manual positioning of the movable member instantaneously overcomes the magnetic interaction; there is no necessity to provide mechanical or electrical disconnections.

Where the control apparatus is specifically for effecting remote control, for example, when housed within an aircraft cockpit to effect thrust changes of remotely situated propulsion plant, it includes position sensitive means for yielding a signal corresponding to position and/or change of position of the movable member.

According to a second aspect of the invention, there is provided a thrust demand unit for an aircraft, the unit comprising:

a fixed housing, a manually movable member supported within the housing for linear movement with respect thereto and having a grip portion extending from the housing, and drive motor means mounted within said housing for moving said movable member under the control of the aircraft autopilot, the drive motor means comprising a magnetically interactive combination of an elongate member and a further member, one of which is coupled to said manually movable member and is arranged for linear movement with respect to the other in the direction of length of the elongate member, and winding means for being electrically driven to influence said magnetically interactive members to produce said movement, said thrust demand unit further comprising drive signal supply means coupled to said winding means for providing electrical drive signals thereto and position sensor means arranged to be influenced by said drive motor means to sense the relative position of magnetically interactive members.

Said drive signal supply means can comprise a plugin electronic module connected via a suitable electrical connector direct to the thrust demand unit housing and including electronic means for generating the drive signals for the drive motor means.

BRIEF DESCRIPTION OF THE DRAWINGS

For a better understanding of the invention, reference will now be made, by way of example, to the accompanying drawings, in which:

FIG. 1 is a sectional elevation of a thrust demand unit for an aircraft,

FIG. 2 is a sectional end-view of the FIG. 1 unit,

FIG. 3 is sectional view of part of a drive motor used in the FIG. 1 unit,

FIG. 4 comprises four diagrams for illustrating the operation of the FIG. 3 motor, FIG. 9 is transverse cross sectional view of a rotar stepper motor.

DETAILED DESCRIPTION OF THE PREFERRED EMBODIMENTS

Figure 5:
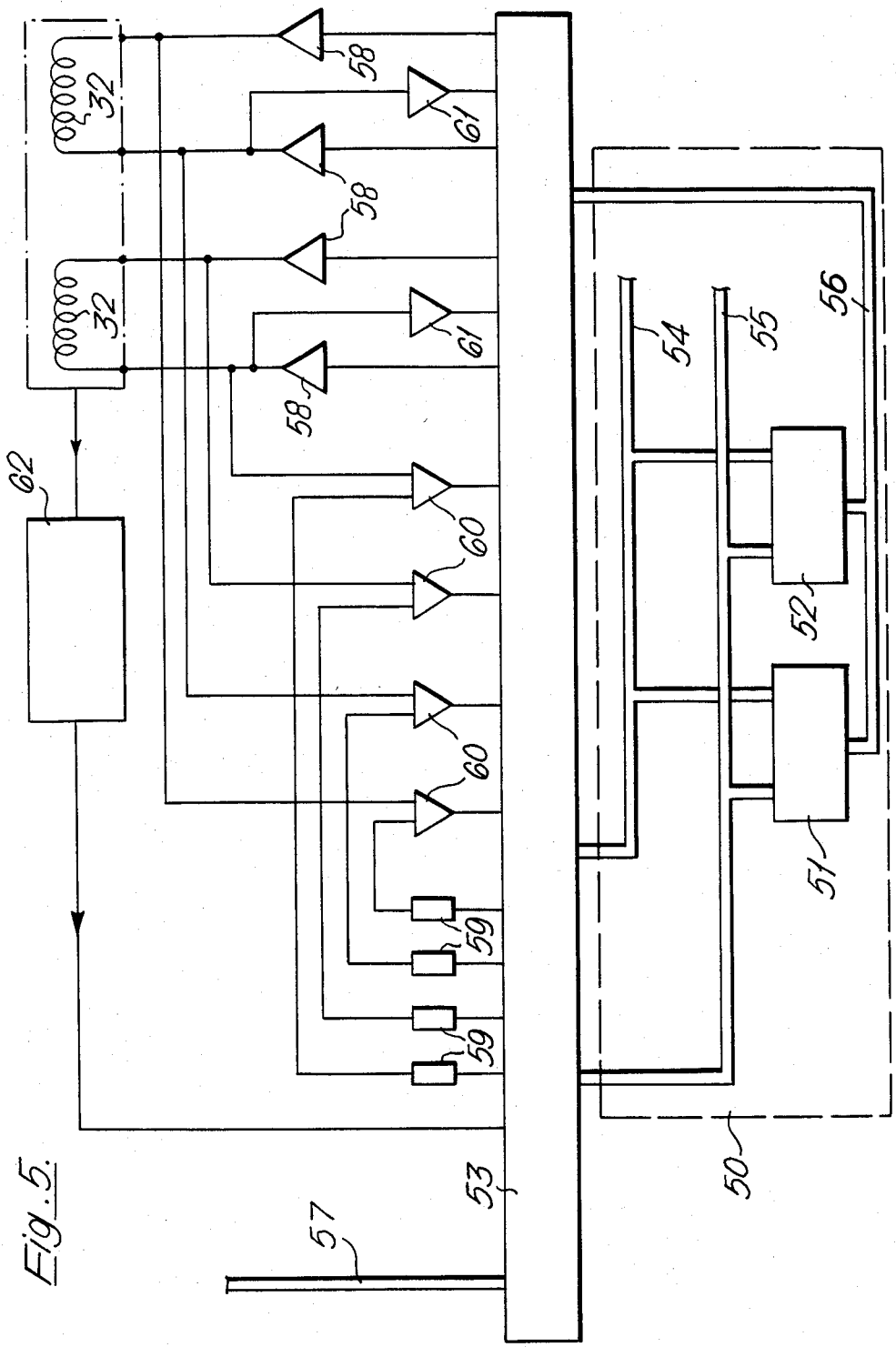
FIG. 5 is a simplified diagram of part of an electrical circuit used in association with the unit of FIG. 1.

The thrust demand unit of FIGS. 1 and 2 comprises a rectangular diecast metal housing 1 to the open top of which there is secured by screws 2 a cover plate 3 having a central longitudinal slot 4 therein. Each end wall 5 of the housing 1 has two bushed bores 6 therein one above the other and each aligned with a corresponding one of the bores 6 in the other end wall. Each two corresponding bores support the ends of a respective one of two shaft-like members 7. Each member 7 forms the stator of a linear drive motor which further comprises a "mover" 8. Each mover 8 comprises a cylindrical housing 9 disposed around the corresponding stator 7 and slidably supported with respect thereto by two bush bearings 10 disposed within the housing 9 near respective ends thereof. At each end of each mover 8, there is a cylindrical portion 11, of less diameter than the main part of each housing 9 and the two movers are coupled together by a hollow yoke 12 which is open at the bottom so that it can be dropped down over the two movers and which has, at each end, a slot 13 engaging opposite sides of the portions 11. The length of the slot is made sufficient to allow tolerance in the dimensions and spacing of the two drive motors. The upper end of the yoke 12 has a narrowed upwardly extending portion 14 extending through the slot 4 in the cover plate 3, the upper end of this portion 14 being slotted to receive a plate 15 forming part of a pilot's handle which further comprises two knurled, cylindrical grip portions 16 fixed by screw 17 each side of plate 15. Plate 15 is fixed to yoke portion 14 by screws 18.

Using the handle, the pilot can move the yoke 12 along with the two motor movers 8 along to any position on the stators 7 within the limits defined by the ends of the slot 4. As described later, such movement controls the aircraft engine throttle. In FIG. 1, the handle is shown at one end of its movement, this being the "throttle-shut" position. At this end, there is a device 19 (shown only diagrammatically) for locking the handle in the shut-down position and/or for defining a pilot removable movement stop at a position a short distance way from the "throttle-shut" position, i.e. at an "engine-idle" position. By way of example, the device 19 could take the form of a lever member (not shown) coupled to a pin (not shown) for moving the pin along its axis between a disengaged position and a position in which it extends into the path of the yoke 12 so that it either abuts one end of the yoke to define the engine idle stop position or engages a matching hole in the yoke to lock the yoke in the throttle-shut position.

In the floor of the housing 1, there is an aperture wherein there is mounted an electrical socket connector 20. The socket connector 20 receives a plug forming part of a "plug-in" electronics module 21 (not shown in detail) containing circuitry for driving the motors, communicating with the engine throttle and aircraft autopilot and so on. The circuitry will be described later with reference to FIG. 5.

The electrical workings of the movers 8, shown in FIG. 1 only as cross-hatched areas 22, and described with reference to FIG. 3) are connected to the module 21 via socket 20 and flexible leads (not shown).

At each end of each stator 7, there is mounted, by any suitable means (not shown), a position sensor 23 containing a Hall effect magnetic-field sensing element 24, these elements also being coupled to the module 21 via leads (not shown) and socket 20.

The pilot's handle is shown in simple form but those skilled in the art will appreciate that it may itself be a quite complex piece of equipment, i.e. it may comprise various pilot operable switches, operated by say push-buttons or by movements of the grip portions 16. As an example, the cylindrical grip formed by the two portions may be rotatable about its axis to operate a switch which causes the reverse-thrust mechanism of the engine to come into operation.

Also, instead of the two portions 16 being of approximately the same length as shown, one could be shorter and the other longer so that, in effect, the grip is offset in relation to the plate 15, this allowing two side-by-side units as used in a two-engine aircraft to be mounted closer together (it will be appreciated that there is normally one thrust demand unit for each engine of the aircraft).

As shown in FIG. 1, each stator 7 comprises an elongate cylindrical member 25 made of magnetisable material and formed with a series of annular recesses to leave defined intervening pole teeth 26. The recesses are filled with non-magnetic material 27 such as copper, and the whole has a thin plating 28 (the thickness of which is exaggerated in the figure for clarity) of material, e.g. chromium, having good sliding properties. For ease of manufacture, the recesses in member 25 may be provided by machining in the member a deep helical thread of rectangular cross-section and shallow pitch, the two movers 8 then being arranged, e.g. by being fitted with suitable abutment pins so that they will not tend to rotate about the stators 7 due to magnetic effects associated with the helical nature of the stator pole teeth.

As shown in FIG. 3, within the cylindrical housing 9 of each mover 8 are two ring-shaped pole assemblies 30 and 31 each carrying a winding 32 and having two spaced sets 33 and 34 of annular grooves in its internal surface to define respective pole tooth sets. The two pole assemblies 30 and 31 are separated by a magnet assembly 35 carrying a permanent magnet 36 made of samarium cobalt rare-earth material and the spacing between the two pole assemblies is such that, while the pole tooth pitch of each assembly corresponds to that of the stator 7, (although the mover teeth are narrower than those of the stator), if the teeth of assembly 30 coincide with the teeth of stator 7 then the teeth of assembly 31 coincide with the gaps between the teeth of stator 7, i.e. teeth of assembly 30 are 180° out-of-phase with the teeth of assembly 31. As with the stator 7, the teeth of the pole assemblies 30 and 31 could be formed by machining a helical internal thread within the assemblies. The magnetic axis of the magnet 36 is parallel to the axis of the stator 7.

The operation of each drive motor can be appreciated by considering the four states illustrated in FIG. 4. In state 1, the windings 32 are each energised by a direct current of constant magnitude to provide a field in the direction opposite that of the magnet 36. The flux path due to magnet 36 is thus as shown by the dashed lines and the mover 8 takes up a position in which the stator and mover teeth are so aligned as to give minimum reluctance for that particular field configuration. Reversal of current in one winding gives state 2 in FIG. 4 with flux path changed as shown and the mover stepping along the stator to take up a new position of minimum reluctance. State 3 occurs when the current in the other winding is reversed and state 4 when the current reversed first is reversed again. A further reversal of the other winding current returns the motor to state 1 but with the mover stepped along the stator by one pitch of the stator pole teeth. From this it will be realised that each step from state 1 to state 2, state 2 to state 3 and so on, steps the mover along the stator by one fourth of the stator pole tooth pitch, the misalignment of the pole sets in the mover being adapted accordingly to give minimum reluctance paths at these quarter-pitch positions.

The plug-in electronic module 21 shown in FIGS. 1 and 2 may comprise, for each drive motor, a drive signal supply and control circuit as shown in FIG. 5. This circuit comprises a microprocessor system 50 including a central processing unit 51 and a memory unit 52 coupled to each other and to an input/output interface unit 53 via data, control, and address bus lines 54, 55 and 56 respectively in conventional manner. The data and control buses may be connected to the aircraft computer and autopilot (not shown). The system shown being a "fly-by-wire" system, the interface unit is connected via bus 57 to a throttle control unit local to the aircraft engine and including, for example, a further microcomputer system and a servo or the like for actually moving the throttle control at the engine. Each end of each of the two motor windings 32 is drivable by a respective drive amplifier 58 fed from the interface unit 53 by the microprocessor system 50, the drive signals being generated by the microprocessor system 50 under the control of the autopilot. By way of example, the autopilot might signal a requirement for movement of the throttle lever in a particular direction by a particular movement whereupon, by virtue of software programmed into system 50, the system outputs the appropriate drive signals to give the required member of movement steps. At the same time, the system 50 initiates operation of a series of waveform generators 59 each of which is operable for producing a simulated waveform corresponding to that which would appear at the respective motor winding terminal were the mover of the motor to remain stationary in the face of a signal to step. As may be appreciated, the waveform at the winding terminal does in fact differ depending upon whether the mover 8 moves or not since, if the mover does move, the resultant change of inductance in the winding distorts the rising edge of the drive signal. The simulated waveform from each generator 59 and the waveform appearing at the output of the corresponding drive amplifier 58 are compared by a respective voltage comparator 60. Correspondence of the waveforms indicates that no step has been taken and this information is given to the system 50 via interface unit 53 which thereafter repeats the appropriate signal. Non-correspondence indicates to the system 50 that a movement step has been executed whereupon the system can output the appropriate signal for the next step. The required amount of movement is stored by the system 50 as a count of the number of steps needed for that movement and each step actually taken causes the count to be decremented until the count is zero whereupon the system 50 maintains the motor at its new position.

From a consideration of FIGS. 3 and 4, it will be appreciated that, when the pilot moves the throttle control unit lever manually while the windings 32 remain energised, each step of movement will cause a pulse e.m.f. to be produced in the motor windings. Unlike back e.m.f. in a conventional electrical motor however, the pulse will be in the same direction as the applied e.m.f., i.e. a pulse will appear on top of the steady-state applied voltage. Since the pole teeth thereof are out-of-phase, the pulses at each winding will also be out-of-phase. The pulses are detected by the system 50 via sensing amplifiers 61 to give, by noting which winding carried the first pulse, the direction of manual movement and, by noting the number of such pulses, the amount of the movement.

The two position sensors 23 in FIG. 1 are coupled to a circuit 62 which compares the signals therefrom in conventional manner to provide information to the system 50 about the absolute position of the throttle lever.

It may be appreciated that, under certain circumstances, the absolute position sensing may not be necessary since, via the pulse sensing amplifiers, the system 50 is able to gain information about manual movement of the throttle lever from the windings 32. The absolute position sensing may however be desirable to allow for the possibility of failure or interruption of the energisation supply to the windings and unrecorded manual movement of the throttle lever during the interruption. Even then, as an alternative to providing the sensors 23, the system 50 could be made to undergo a start-up routine following any interrruption, e.g. by moving the throttle lever quickly to an extreme position while counting the steps of this movement and then when it has sensed from the signals formed by comparators 60 that the extreme position is reached (i.e. when further movement does not occur), moving the lever back through the same number of steps to its original position. Thereby, the system 50 can obtain a fix on that position.

When the system 50 is maintaining the throttle lever position stationary, it may be operable to energise the windings 32 at only a proportion of the maximum value and this proportion may be made pilot controllable to give a desired resistance, dependent upon personal choice, to manual throttle lever movement. By way of example, the steady state energisation may be made variable between 30 and 70% of maximum. The motors can then be designed so that, with maximum energisation, the resistance to manual movement is quite substantial and this provides a means of setting detents to manual movement without the use of mechanical detents as in known units. Thus, instead of such mechanical detents, the system 50 can be made operable to sense manual movement of the throttle lever to a predetermined detent position and then to immediately raise the winding energisation to its maximum value.

Of course, it will be appreciated that suitable mechanical detents could be provided if preferred. Usually several are required, e.g. at throttle positions of idle, maximum dry/reheat and so on, and they can take the form of simple spring-loaded plungers arranged at appropriate positions in one side of the housing 1 and operable to engage an appropriate depression in the yoke 12.

It will be further appreciated that, if the absolute position encoding means is provided, it need not take the form of two Hall effect sensors as shown but could instead comprise say an optical sensor with a light source coupled to the yoke 12 and say a prism arranged beneath the yoke and arranged to direct light from the source onto a photosensitive postion encoder.

It is not essential that the unit should comprise two drive motors as shown-one or more than two such motors could be provided. Two motors are used in the illustrated embodiment to give a desired degree of redundancy. As an added advantage, the two could be arranged with their pole teeth offset by 180° so as to give a finer resolution in the throttle lever position.

For an aircraft having two or more engines, a plurality of drive motor/grip lever controls as described could be mounted in a single housing.

Finally, the actual software incorporated into the system 50 is to some extent a matter of choice and may be fairly conventional—in any case, it should be achievable by those skilled in the art. As an example, the interaction of the system 50 and the aircraft autopilot might be as follows. When the flight control system demands a change in thrust from the power plant, this demand is addressed to the power plant computer which complies immediately. Having set the new thrust level the computer then addresses the throttle box for actual throttle position. On receipt of this information the computer calculates the number of steps that the auto throttle motor must take in order to re-align with a position commensurate with the demanded thrust level. Having computed the direction and number of steps required the power plant computer signals this information to the throttle box. The motor controller signals the auto-throttle motor to take the required number of steps ramping up from the start and ramping down at the end of travel automatically.

Power supplies should ideally be taken from an interrupt free source i.e. engine control supply which is dual redundant with battery back-up. If, however, power supplies should fail the actual handle position is held in non-volatile R.A.M. meanwhile the engine control is frozen at the last demanded position. On re-instatement of the supplies the handles will automatically be driven down to the original datum i.e. throttle stop at minimum demand and then driven back to the position defined in the non-volatile RAM. Only after this position has been reached will the thrust and handle position be synchronised. Should flight control system demand a thrust change during a power down period the non-volatile RAM will be updated on re-instatement of supplies.

Figure 6:
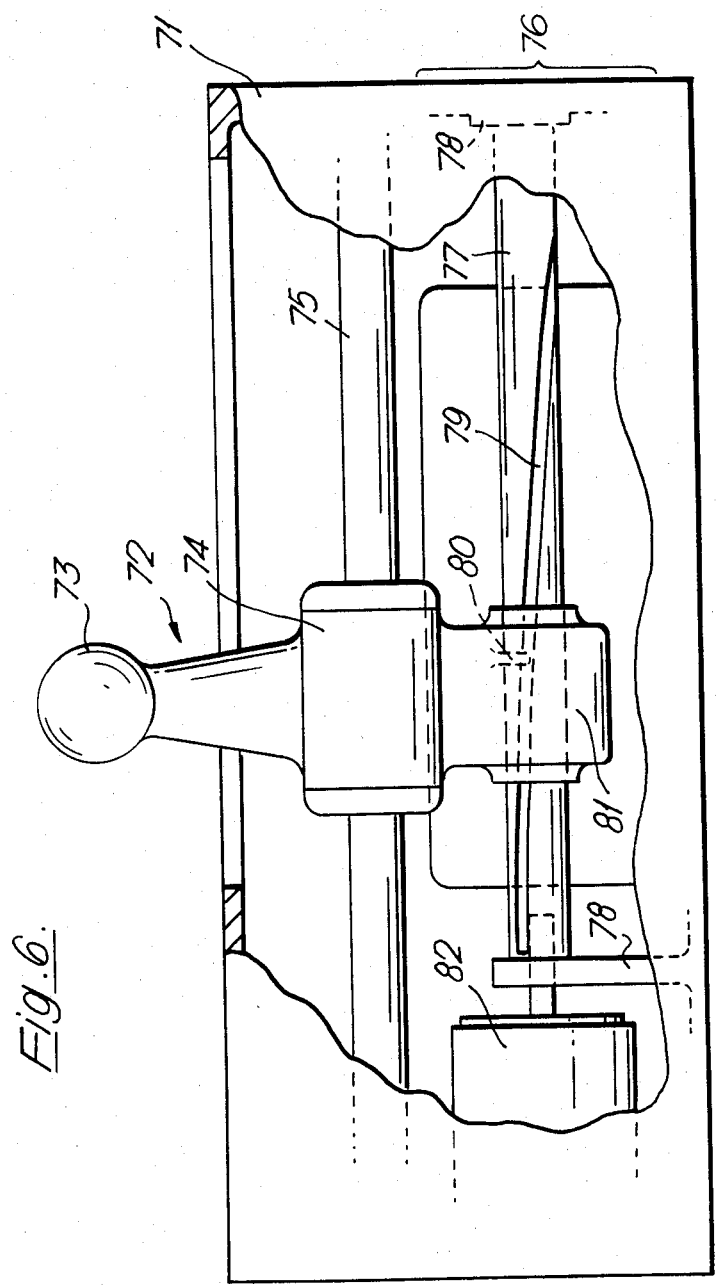
FIG. 6 is diagrammatic side elevation of another thrust demand unit.

The thrust control unit of FIG. 6 comprises a box-like housing 71 and, protruding from the housing, a throttle lever 72 having a hand grippable portion 73. It also has an annular bearing portion 74 which is located for sliding movement upon a rod 75 fixedly carried inside the box 71. The lever 72 is positionable both by hand and automatically by a drive motor including a mover associated with the bearing portion 74 and a stator rod 75 which extends through it. These components are similar to those described in relation to FIGS. 1 to 5. The motor is in fact a kind of linear stepper motor and it is energised by input signals received from an autopilot (not shown) which demand a particular position of the throttle lever 72. The motor is instantaneously overridable by hand positioning of the lever 72.

Since the throttle assembly controls propulsion engines mounted remote from the cockpit, it includes position sensitive means 76 for yielding an output signal corresponding to position and/or change of position of the throttle lever which signal is transmitted to the remote site. The means 76 in the embodiment of FIG. 6 includes a rotatable shaft 77, lying below and parallel to the fixed stator rod 75, carried in bearings 78 within the box 71. The shaft 77 is rotated by the co-operation of a scroll groove 79 formed upon the shaft 77 with a scroll follower 80 carried by the lever 72, the bearing portion 74 of the lever 72 being extended downwards to provide an annular scroll follower carrying region 81 through which the shaft 77 extends.

Thus the linear position of the lever 72 is converted to an angular position of the shaft 77. A rotary, that is to say angular, position encoder 82 is driven by the shaft 77 and this transmits a signal corresponding to the shaft position, and hence the lever postion, to the remote engine.

Figure 7:
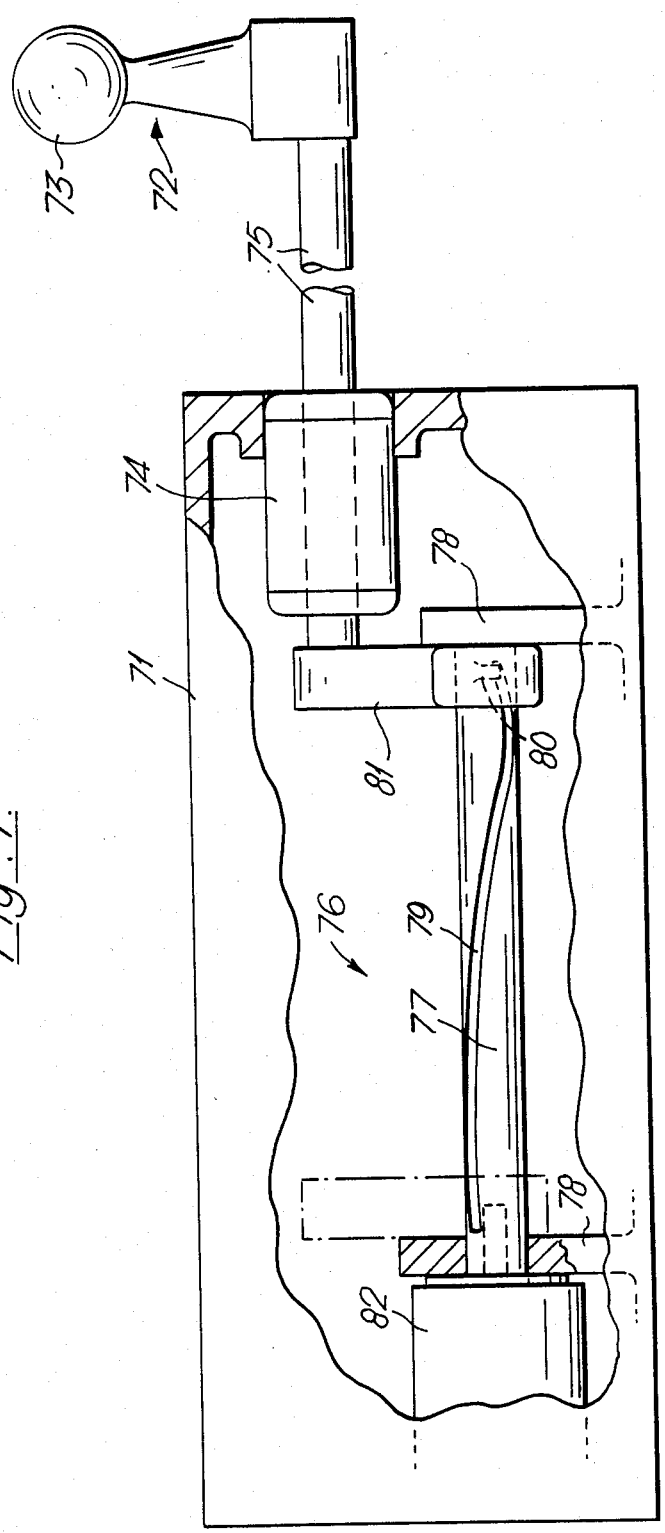
FIG. 7 is a similar view of a third thrust demand unit.

FIG. 7 illustrates a similar arrangement to FIG. 6 but in which the stator rod 75 is made movable with the lever 72, and hence in effect becomes the mover of the motor while the bearing portion 74 is fixed and hence becomes the motor stator. Naturally, the arrangement operates identically to the arrangement of FIG. 6; like components are given like reference numerals. The region 81 is carried by the rod 75 rather than the lever 72.

Figure 8:
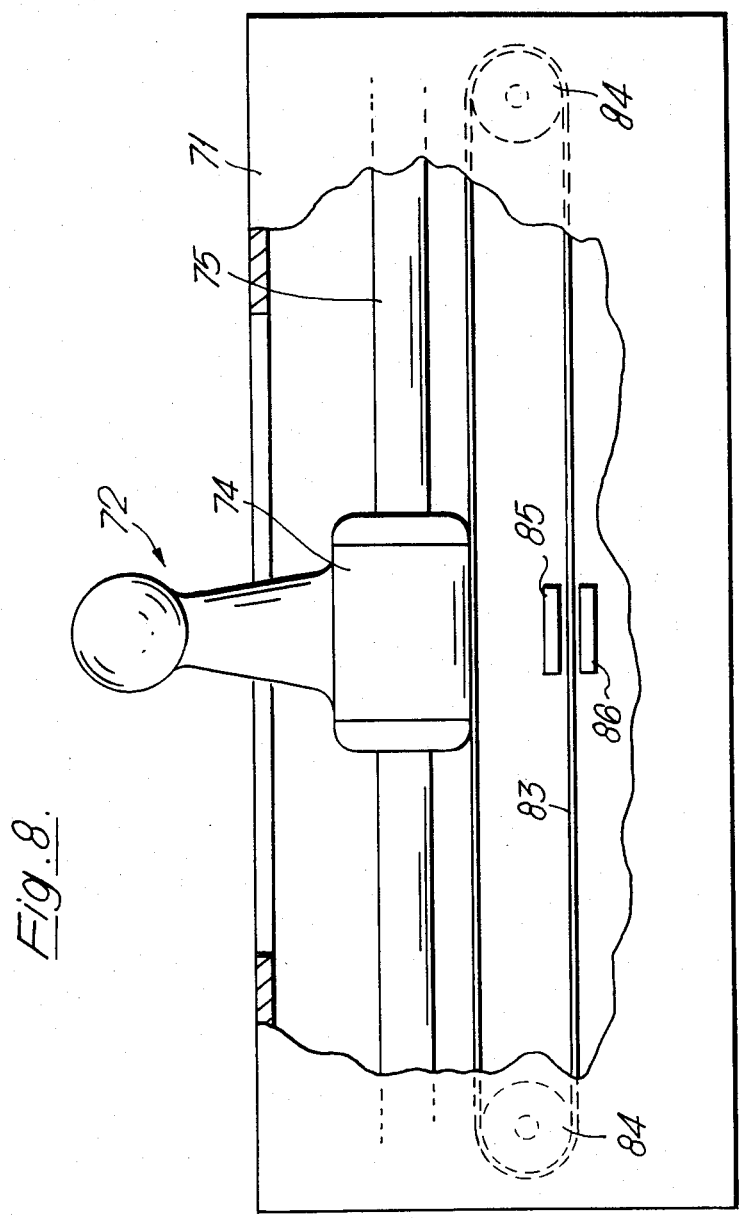
FIG. 8 is a further similar view of a fourth thrust demand unit.

The position sensitive means 76, although effective, may be replaced by the arrangement of FIG. 8, which is of lighter weight and may occupy a smaller volume.

It forms, what is in effect a linear position encoder, and includes an endless band 83 carried upon rollers 84, the roller being mounted with the box 71 and the band being coupled to the lever 72. The band is of translucent material with an opaque pattern marked thereon. A light source 85 projects a beam through the band to be received at 86 and the interruption of the beam by the opaque pattern as the band moves with the lever 72 gives an indication of the exact lever position.

It will be appreciated that the kind of drive motor shown herein is suited to closed loop feedback control using a microprocessor for step commands. Such a closed loop feedback system may monitor the current waveform from the instant of current reversal in a phase winding. The waveform follows an exponential trace until the full load current value is reached. Should the motor succeed in carrying out a step the current is held at a constant value, significantly less than that of full load for the period that the step is taking place. At the completion of the step, the current rises to the normal full load value. Thus, using waveform generators and voltage comparators on each side of each phase winding, individual steps taken can be signalled to the microprocessor. It therefore follows that after initialisation the processor knows the position of the motor, the number of steps required to any desired position, and the number of steps actually taken. Should the motor be manually repositioned whilst under auto control, the feedback loop may remain active and the processor will recognise the manual repositioning and update its memory accordingly.

Referring now to FIG. 8, it is apparent that in an alternative embodiment, the lever 72 can be angularly, that is to say, rotatably, positioned instead of the described linear positioning arrangement. In this case, a rotary stepper motor can be utilised; such a motor is described with reference to FIG. 8.

The rotary stepper motor is manufactured with a wound stator and either permanent magnet or soft iron rotor. Stators are wound with two or more phase windings. The machine may be designed in a multi-toothed stator/rotor configuration for high resolution small angular increments.

Dependent upon stator winding and desired performance, a stepper motor can be excited in several different modes. However, the principles are similar to those of the linear motor in that the rotor will take up a position of minimum reluctance to the applied field. A two phase machine can have each phase energised sequentially or can have both phase windings energised simultaneously with the direction of current flow being changed alternatively in each phase winding. Three phase machines have a sequential operation; two of the three phase windings being energised simultaneously.

For all the embodiments shown, possible overshoot and/or oscillation of the motor can be controlled by various means.

Mechanical damping can be provided by viscous-inertia dampers, friction brakes, eddy current dampers, etc., but mechanical damping will load the motor and cause an increase in step times.

Delayed-last-step damping balances system momentum against the torque produced by the motor. It requires the controller to adjust the step time interval of the last two steps of motion. The next to the last step pulse is delayed until the energy input will just cause a 1 step overshoot and the final step pulse is given when the final step has been taken, thus locking the rotor magnetically at the final step. It can be seen that any change in friction or inertia would result in loss of motor response characteristic unless a closed loop control system were operated.

Back phasing is another damping technique which involves re-energising the previous phase whilst the present phase is employed in energising the final step function. Re-energisation of the previous phase institutes a retarding torque which is only removed when it is balanced by rotor momentum, i.e. the rotor is momentarily at rest. The final step function is then completed and the rotor locked in the correct position.

Provided that motor loads are constant open loop microprocessor control of rotary stepper motors would appear adequate. Control consists of look up tables for acceleration/deceleration in the processor memory bank. The controller monitors the number of steps remaining in the counter and determines how long acceleration should continue and when deceleration should begin.

It will be appreciated that instead of the drive motor illustrated in FIGS. 1 to 7, a different kind of linear motor could be used, for example a linear induction motor.

I claim:

1. A control device for enabling an operator to control associated apparatus to which, in use, the control device is connected, the control device comprising:
    a fixed support member;
    a control member supported by the support member and movable with respect thereto by said operator;
    output means connected to the control member and operable for transmitting to said associated apparatus control signals indicative of the position of said control member relative to the support member;
    an electrical stepper motor of which the stator part is connected to said support member and the mover part is connected to said control member; and
    motor energization means which is connected to said stepper motor and which is operable for energizing said motor to generate, at least while said control member is at one or more discrete positions in its range of movement relative to the support member, an attractive force between the stator and mover parts of the motor tending to resist manual movement of the control member.

2. A control device according to claim 1, wherein said motor energization means comprises an input for receiving control signals from automatic control means and being operable in response to said control signals to energize said motor to produce movement of said mover part of the motor and corresponding movement of the control member relative to the support member, the motor force generated in producing such movement of the control member being nevertheless overridable by said operator without mechanically or electrically disabling the motor.

3. A control device according to claim 1, including control means settable by the said operator and connected to the motor energization means for controlling the energization level of said motor to thereby cause said motor to produce an operator selectable feel force resisting movement of the control member throughout its range of movement relative to said support member.

4. A control device according to claim 1, including control means connected to the motor energization means operable for sensing the position of said control member for increasing the energizing of said motor by said motor energization means when the control member is at one or more discrete detent positions within its range of movement relative to the support member, whereby said operator will feel substantially greater resistance to movement of the control member through the or each such position that is felt when the control member is elsewhere in its range of movement.

5. A control device according to claim 1, wherein said support member is in the form of a box-like housing, said control member being supported for linear movement with respect to the housing, at least a grip portion of the control member being outside of the housing, and said motor being mounted within said housing with its stator part fixed with respect to the housing and its mover part coupled to said control member.

6. A control device according to claim 5, wherein said stepper motor is a linear stepper motor comprising an elongated stator part, the mover part being mounted on and being slidable along the stator part, and the control member being supported by the mover part.

7. A control device according to claim 5, wherein said stepper motor is a linear stepper motor comprising an elongated mover part one end of which extends from said housing and has said operating member attached thereto, and which is slidable with respect to the stator part of the motor.

8. A control device according to claim 1, wherein said output means comprises position sensing means operable for generating electrical signals indicative of the position of the control member relative to the support member.

9. A thrust demand unit for an aircraft, the unit comprising:
    a fixed housing;
    a manually operable control member supported within the housing for linear movement with respect thereto and having a grip portion extending from the housing;
    output means connected to said control member and operable for transmitting to an engine of said aircraft thrust control signals indicative of the position of the control member relative to said housing;
    an electrical linear stepper motor mounted within said housing and including a stator part fixed with respect to said housing, a mover part connected to said manually movable member, and winding means for being energized to produce magnetic interaction between said stator and mover parts of the motor; and
    motor energization means connected to said motor and having a control input for being connected to an autopilot computer of the aircraft, the motor energization means being operable for responding to control signals from said autopilot computer to energize said motor to produce movement of the mover part thereof and corresponding movement of said control member relative to said housing, the motor force generated in producing such movement being nevertheless overridable by manual manipulation of said control member without mechanically or electrically disabling the motor, and the motor energization means being further operable at least while said control member is at one or more discrete positions in its range of movement relative to the housing for energizing the motor to a level which is insufficient for producing movement of said control member but which tends to resist manual movement of the control member.

10. A thrust demand unit for an aircraft, the unit comprising:
- a fixed housing;
- at least one electrical linear stepper motor including an elongated rod-like stator mounted within the said housing, a slider member mounted on said stator rod and slidable therealong, and winding means contained within said slider member and operable for being energized to produce magnetic interaction between the stator rod and slider member;
- a manual control member mounted on the slider member of said motor and having a grip portion extending from the housing;
- position sensing means for forming electrical signals indicative of the position of said manual control member relative to said housing; and
- motor energization means connected to said motor and operable for energizing the motor to produce a controlled feel force tending to resist manual movement of said control member throughout its range of movement relative to said housing.

11. A thrust demand unit according to claim 10, wherein said energization means is connected to said position sensing means and is responsive to the position sensing means to increase the motor energization and hence increase the resistance to manual movement of the control member when the control member is at one or more predetermined detent positions in its range of movement relative to the housing.

12. A thrust demand device comprising:
- a fixed support member;
- a control member supported by the support member and movable with respect thereto by said operator;
- output means connected to the control member and operable for transmitting to said associated apparatus control signals indicative of the position of said control member relative to the support member;
- an electrical linear stepper motor of which the stator part is connected to said support member and the mover part is connected to said control member; and
- a motor energization means connected to said stepper motor and which is operable for energizing said motor to generate, at least while said control member is at one or more discrete positions in its range of movement relative to the support member, an attractive force between the stator and mover parts of the motor tending to resist manual movement of the control member.

13. A control device for enabling an operator to control associated apparatus to which in use the control device is connected, the control device comprising:
- a fixed support member;
- a control member supported by the support member and movable with respect thereto by said operator;
- output means connected to the control member and operable for transmitting to said associated apparatus control signals indicative of the position of said control member relative to the support member;
- an electrical linear stepper motor of which the stator part is connected to said support member and the mover part is connected to said control member; and
- a motor energization means connected to said stepper motor and which is operable for energizing said motor to generate, at least while said control member is at one or more discrete positions in its range of movement relative to the support member, an attractive force between the stator and mover parts of the motor tending to resist manual movement of the control member.

* * * * *